United States Patent [19]

MacKenzie, Jr. et al.

[11] 3,908,067

[45] Sept. 23, 1975

[54] FLAME RESISTANT POLYOLEFIN, METHOD OF PRODUCING SAME, AND INSULATED PRODUCT

[75] Inventors: Burton Thornley MacKenzie, Jr., Monroe; Maurice Prober, Fairfield, both of Conn.

[73] Assignee: General Electric Company, New York, N.Y.

[22] Filed: Sept. 12, 1974

[21] Appl. No.: 505,234

[52] U.S. Cl. ... 428/379; 260/45.75 B; 260/45.85 E; 260/486 H; 260/897 A
[51] Int. Cl.² ............................................ H01B 3/30
[58] Field of Search .. 260/486 H, 45.85 E, 45.75 B, 260/897 A; 117/232

[56] References Cited
UNITED STATES PATENTS

| | | | |
|---|---|---|---|
| 3,165,502 | 1/1965 | Caldwell | 260/86.1 |
| 3,214,422 | 10/1965 | Mageli et al. | 260/94.9 |
| 3,267,070 | 8/1966 | Tousignant et al. | 260/45.85 |
| 3,271,333 | 9/1966 | Eichhorn | 260/45.85 |
| 3,277,053 | 10/1966 | Hill et al. | 260/486 |
| 3,316,329 | 4/1967 | Waples | 260/486 |
| 3,660,351 | 5/1972 | Schmidt et al. | 260/45.85 |
| 3,773,715 | 10/1973 | Largman et al. | 260/45.85 |
| 3,806,358 | 4/1974 | Glander et al. | 117/232 |

FOREIGN PATENTS OR APPLICATIONS 1,535,400  9/1967  France

*Primary Examiner*—V. P. Hoke
*Attorney, Agent, or Firm*—Raymond G. Simkins; P. L. Schlamp; F. L. Neuhauser

[57] ABSTRACT

The addition of a diacrylic acid ester of tetrabromotetramethyldiphenol to polyolefins, the flame resistant combination thereof, and flame resistant insulated conductor product.

24 Claims, 1 Drawing Figure

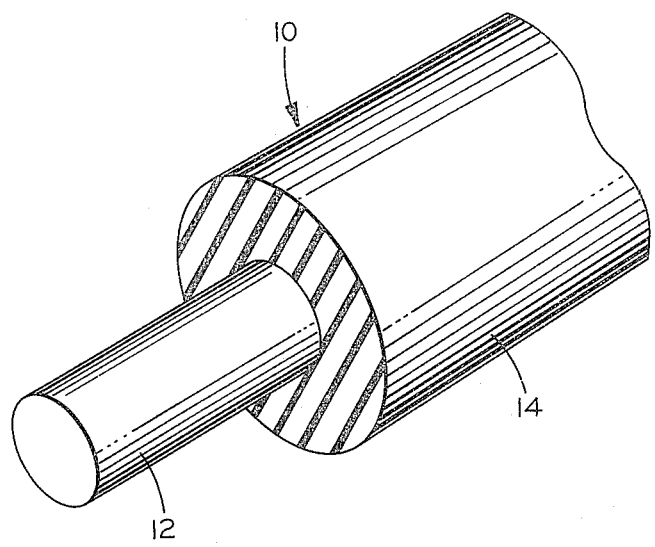

FLAME RESISTANT POLYOLEFIN, METHOD OF PRODUCING SAME, AND INSULATED PRODUCT

BACKGROUND OF THE INVENTION

The increased use of polymeric compositions such as polyolefins in many and diverse applications or products, and the combustibility of polymeric materials, has greatly stimulated the investigation of flame-proofing measures for polymeric compositions. Moreover, the high costs of fire damage in lives and property, and the imposition of increasingly stringent safety regulations, have recently significantly intensified the pursuit of more effective or practical means of controlling or inhibiting combustion in many products and materials.

Notwithstanding the prior development of a great number of flame-proofing measures or additives resulting from this expanding effort, there remains a continuing need for improvements to meet current or new requirements in this area.

SUMMARY OF THE INVENTION

This invention comprises the discovery of the improved resistance to flame or combustion and other advantages attributable to a diacrylic acid ester of tetrabromotetramethyldiphenol in combination with polyolefins such as polyethylene. The invention thus relates to flame-resistant polyolefin compounds and a method of rendering such compounds resistant to flame and combustion, and it has particular utility in flame-proofing electrical insulations comprising ethylene-containing polymer compounds.

OBJECTS OF THE INVENTION

It is a primary object of this invention to provide polyolefin compounds of improved resistance to flame and combustion, and a method of producing same.

It is also an object of this invention to provide a flame-proofing material for polyolefin compounds which retains its potential to inhibit flaming and combustion of polyolefins over extended periods of time and throughout exposure to many adverse conditions.

It is a further object of this invention to provide a polymeric compound containing a polyolefin admixed with a flame-proofing material which is highly resistant to extraction by bleeding or leaching from the compound, and which has desired thermal stability at temperatures below flame conditions and thus is not subject to premature decomposition or vaporization resulting from emission of its halogen at elevated temperatures appreciably below those approaching flame conditions.

It is a still further object of this invention to provide a flame-proofing material and polyolefin compounds containing the same which do not discernably corrode or tarnish metals, such as copper, and thus is serviceable as an effective and practical flame-resistant polyolefin electrical insulating compositions for metal wires or cables, and other metallic electrical conductors.

It is an additional object of this invention to provide an improved, flame-resistant insulated electrical conductor.

BRIEF DESCRIPTION OF THE DRAWING

The drawing comprises a perspective view of an insulated conductor comprising a metallic wire having a polymeric insulation thereabout.

DESCRIPTION OF A PREFERRED EMBODIMENT

In accordance with this invention, a high level of resistance to flame and combustion is achieved in polyolefin compounds comprising ethylene-containing polymers, among other improved and advantageous attributes, by admixing and combining with such polyolefins a diacrylic acid ester of tetrabromotetramethyldiphenol.

The polyolefin compositions of this invention comprise ethylene-containing polymers such as polyethylene, copolymers of ethylene and other polymerizable materials, and blends of such polymers including copolymers. Typical copolymers of ethylene and other polymerizable materials include, for example, ethylene-propylene copolymers and ethylene-propylene diene terpolymers, ethylene-vinyl acetate, ethylene-ethyl acrylate and ethylene-methyl acrylate.

The polyolefin compounds of this invention can comprise fillers, pigments, crosslinking curing agents such as organic peroxides, curing coagents, and other conventional additives including preservatives such as antioxidants, modifying agents, mold release ingredients and the like, which are commonly compounded with polyolefins.

The invention also applies to and includes all of the above-referenced polyolefins whether in an uncured or thermoplastic state, or crosslink cured and thermoset by means of radiation or a heat-activated peroxide crosslinking agent such as disclosed in U.S. Pat. Nos. 2,888,242; 3,079,370; 3,086,966; and 3,214,422. Suitable peroxide crosslink curing agents comprise organic tertiary peroxides characterized by at least one unit of the structure:

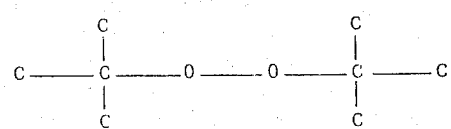

which decomposes at a temperature above about 295°F and thereby provide free radicals. A preferred peroxide is a diαcumyl peroxide, and other apt peroxides comprise the tertiary diperoxides such as 2,5-dimethyl-2,5-di(t-butyl peroxy) hexane and 2,5-dimethyl-2,5-di(t-butyl peroxy) hexyne-3, and the like diperoxy and polyperoxide compounds.

The improved flame-proofing material of this invention, tetrabromotetramethyldiphenol acrylate, consists of a diacrylic acid ester of the dihydric phenol, 3,3',5,5'-tetrabromo-2,2', 6,6'-tetramethyl-p,p'-diphenol, having the structural formula:

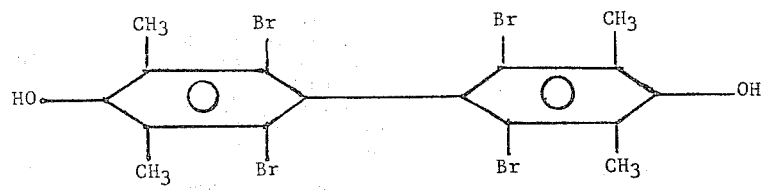

Tetrabromotetramethyldiphenol can be prepared, as is known in the art, by heating a stiochiometric excess of bromine dissolved in a suitable solvent such as carbon tetrachloride, together with 3,3',5,5'-tetramethyl-diphenoquinone, preferably in the presence of a Friedel Crafts caralyst such as stannous chloride.

The acrylic ester flame-proofing material is the esterification reaction product of the aforedescribed tetrabromotetramethyldiphenol compound and acrylic acid or an alkyl substituted alpha acrylic acid comprising:

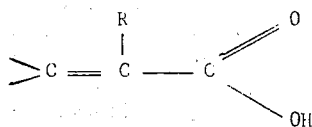

where R is hydrogen or an alkyl group containing up to about 10 carbon atoms, and their respective isomers. Because of their availability, acrylic and methacrylic acids are preferred over the higher alkyl substituted acrylic acid derivatives of such unsaturated monocarboxylic acids.

The structural formulation for the diacrylic acid ester of tetrabromotetramethyldiphenol of this invention comprises:

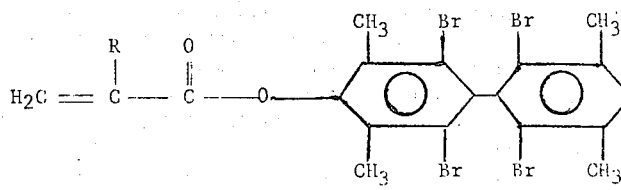

wherein R and R1 is a hydrogen atom or an alkyl group.

The diacrylic acid ester of the dihydric phenol of this invention can be mixed and combined with a polyolefin component by means of any conventional compounding method or apparatus, such as working in a Banbury mixer or on a two roll rubber mill. Preferably all ingredients of the compound formulation, except those which are sensitive to the relatively moderate mixing temperatures of about 300°F to about 400°F, such as a heat decomposable peroxide curing agent, are combined and initially admixed together at a temperature sufficient to soften and plasticize the particular polyolefin ingredient. Following the attainment of substantial uniformity of the admixed ingredients, the temperature of the admixed batch is reduced below the decomposition level of the particular peroxide curing agent, or other heat sensitive ingredient, and the curing agent or other sensitive ingredient is then introduced and dispersed preferably uniformly in the mix.

The proportions of the flame proofing diacrylic acid ester of tetrabromotetramethyldiphenol ingredient admixed with the polyolefin compounds depend, of course, upon the desired or required degree of resistance to flame and combustion, and the content of polymeric or other combustible materials in the compound. Suitable amounts for effective flame resistance in polyolefins comprise about 5 to about 20 parts by weight of the diphenol acrylate per 100 parts by weight of the organic polymer content of the compound. However, greater or smaller quantities will suffice for particular applications.

In accordance with this invention, the level of resistance to flame provided by the use of the diphenol acrylate of this invention in combination with a polyolefin compound can be enhanced by the inclusion of a metal oxide, preferably an oxide of antimony, such as antimony trioxide, in the combination. Suitable amounts of such oxides of antimony or other metals include about 2 to about 10 parts by weight per 10 parts by weight of the diphenol acrylate.

Additionally, a significant improvement and advantage of this invention, results from the fact that unlike many halogen-containing flame proofing agents, the material of this invention does not react adversely with, and corrode or tarnish metals such as copper. Thus, the invention is especially useful and advantageous in providing flame-resistant polymeric electrical insulations for metallic conductors. The provision of flame-resistant insulating coverings for electrical conductors which do not corrode the conductors is especially advantageous in wiring for electronic apparatus.

The improvements and advantages of this invention are demonstrated by the following examples of the practice of the invention, and the data derived from the examples of the invention and related prior art means or practices.

The formulations of the examples of this invention and for the comparative standards are all given in parts by weight of the enumerated ingredients. The compositions of all examples and all standards were prepared and evaluated identically. That is, all ingredients except the peroxide curing agent were initially combined and mixed on a two roll rubber mill at a mill temperature of about 210°F for approximately 10 minutes, then in each case the temperature of the mix was reduced to about 200°F and the peroxide added and dispersed therethrough by mixing for about 2 minutes. The examples of this invention and the standards are as follows:

| INGREDIENTS | EXAMPLES | | STANDARDS | | | |
|---|---|---|---|---|---|---|
| | I | II | A | B | C | D |
| Polyethylene | 100 | 100 | 100 | 100 | 100 | 100 |
| Calcined clay* | 50 | 50 | 50 | 50 | 50 | 50 |
| Antioxidant (Agerite D) (polymerized trimethyl dihydroquinoline) | 1 | 1 | 1 | 1 | 1 | 1 |
| Di α cumyl peroxide curing agent | 3.37 | 3.37 | 3.37 | 3.37 | 3.37 | 3.37 |
| Diacrylic acid ester of tetra-bromotetramethyldiphenol | 10 | 10 | — | — | — | — |
| Tetrabromotetramethyldiphenol | — | — | — | 10 | — | — |
| Antimony trioxide on inert carrier — ONCOR 23A | — | 5 | — | 5 | — | 5 |
| Decabromobiphenyl | — | — | 10 | — | — | — |
| Tetrabromotetramethyldiphenol diallyether | — | — | — | — | 10 | 10 |

| INGREDIENTS | EXAMPLES | | STANDARDS | | | |
|---|---|---|---|---|---|---|
| | I | II | A | B | C | D |
| PROPERTIES | | | | | | |
| Oxygen Index | 0.221 | 0.241 | 0.208 | 0.210 | 0.198 | 0.198 |
| Copper mirror test Percent removed after 16 hours at 175°C | 0 | 0 | 5 | — | — | — |

*Clay treated with 1% by weight of dimethyl silicone tetramer according to U.S. Pat. No. 3,148,169.

The relative resistance to flame or combustion of each composition of the examples of this invention and of the standards is demonstrated by the Oxygen Index Test (ASTM D-2863-70) data which designates the fraction of oxygen by volume in nitrogen required to just maintain flame for a material. Thus the higher the oxygen index for a material, the better is resistance to combustion and flame.

The oxygen index test demonstrates the pronounced improvement in flame resistance of the compositions of this invention over similar materials.

The copper mirror test which measures the potential corrosive properties of materials on metal, is as follows: A given sample of the material for evaluation is placed in a test tube together with a copper glass mirror comprising vacuum deposited copper of a known weight. The copper mirror is suspended in the test tube above the sample and the tube sealed. The lower end of the sealed tube is then heated at 175°C for 16 hours in an oil bath or other suitable means while its upper end containing the copper mirror is maintained below 60°C. After heating for 16 hours, the copper mirror is removed and examined for evidence of corrosion, and if 50% or more of the copper is removed from the mirror, the material is classified as corrosive with respect to copper. Results are reported as percentage copper removed.

Referring to the drawing, there is shown a typical construction for an insulated electrical wire or cable product 10, comprising a metallic conductor 12 and an overlying body of cured polymeric insulation 14 extending thereabout or covering the conductor. In the drawing, the product 10 is illustrated as a short section with the insulation 14 removed from the end portion of the conductor 12. According to one embodiment of this invention, the novel flame resistant cured polyolefin thereof can be used to provide or form the insulation 14 on conductor 12 of wire or cable product 10.

Although the invention has been described with reference to certain specific embodiments thereof, numerous modifications are possible and it is desired to cover all modifications falling within the spirit and scope of the invention.

What we claim as new and desire to secure by Letters Patent of the United States is:

1. A Flame-resistant polyolefin compound comprising a polyolefin and an amount sufficient to effect flame resistance of a diacrylic acid ester of tetrabromotetramethyldiphenol and at least one unsaturated monocarboxylic acid selected from the group considting of acrylic acid and an alkyl substituted acrylic acid having the formula:

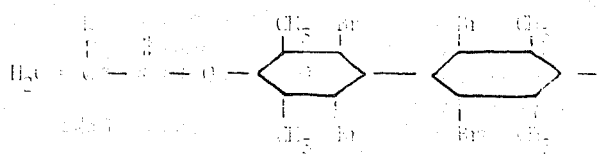

wherein R and $R_1$ is hydrogen or an alkyl group.

2. The flame-resistant polyolefin compound of claim 1, comprising about 5 to about 20 parts by weight of the diacrylic acid ester of tetrabromotetramethyldiphenol per 100 parts by weight of polyolefin.

3. The flame-resistant polyolefin compound of claim 1, wherein the polyolefin comprises at least one ethylene-containing polymer selected from the group consisting of polyethylene, copolymers of ethylene and other polymerizable materials, and blends of such polymers.

4. The flame-resistant polyolefin compound of claim 1, comprising an oxide of antimony.

5. The flame-resistant polyolefin compound of claim 1, wherein the polyolefin compound is crosslink cured to a thermoset condition.

6. A flame-resistant polyolefin compound comprising at least one ethylene-containing polymer selected from the group consisting of polyethylene, copolymers of ethylene and other polymerizable materials, and blends of such polymers, and about 5 to about 20 parts by weight of a diacrylic acid ester of tetrabromotetramethyldiphenol and at least one unsaturated monocarboxylic acid selected from the group consisting of acrylic acid and methacrylic acid per 100 parts by weight of the ethylene-containing polymer having the formula:

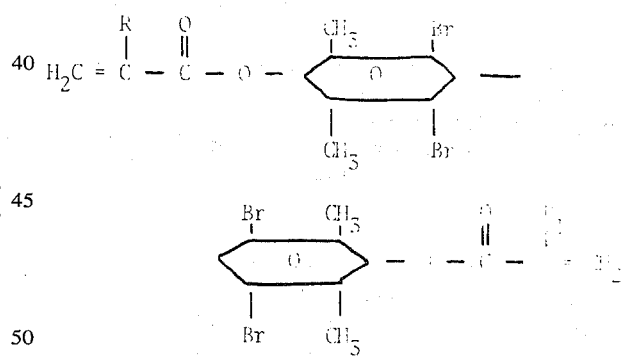

wherein R and $R_1$ is hydrogen or an alkyl group.

7. The flame-resistant polyolefin compound of claim 5, wherein the diacrylic acid ester of tetrabromotetramethyldiphenol is in an amount of about 10 parts by weight per 100 parts by weight of the ethylene-containing polymer, and the compound includes an oxide of antimony.

8. The flame-resistant polyolefin compound of claim 7, wherein the polyolefin compound is crosslink cured to a thermoset condition.

9. A method of rendering polyolefin compounds resistant to flame, comprising admixing with a polyolefin compound an amount sufficient to effect flame resistance of a diacrylic acid ester of tetrabromotetramethyldiphenol and at least one unsaturated monocarboxylic acid selected from the group consisting of acrylic acid and an alkyl substituted acrylic acid having the formula:

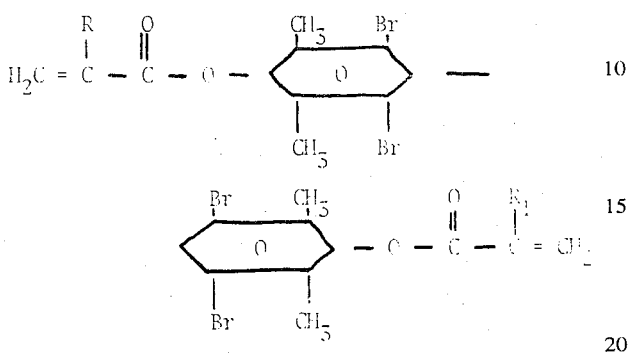

wherein R and $R_1$ is hydrogen or an alkyl group.

10. The method of claim 9, wherein the diacrylic acid ester of tetrabromotetramethyldiphenol in an amount of about 5 to about 20 parts by weight is admixed with 100 parts by weight of the polyolefin.

11. The method of claim 9, wherein the polyolefin comprises at least one ethylene-containing polymer selected from the group consisting of polyethylene, copolymers of ethylene and other polymerizable materials, and blends of such polymers.

12. The method of claim 9, comprising the addition of an oxide of antimony.

13. The method of claim 9, comprising crosslink curing the polyolefin to a thermoset condition.

14. A method of rendering polyolefin compounds resistant to flame, comprising admixing about 5 to about 10 parts by weight of a diacrylic acid ester of tetrabromotetramethyldiphenol and at least one unsaturated monocarboxylic acid selected from the group consisting of acrylic acid and methacrylic acid with 100 parts by weight of at least one ethylene-containing polymer selected from the group consisting of polyethylene, copolymers of ethylene and other polymerizable materials, and blends of such polymers, said diacrylic acid ester having the formula:

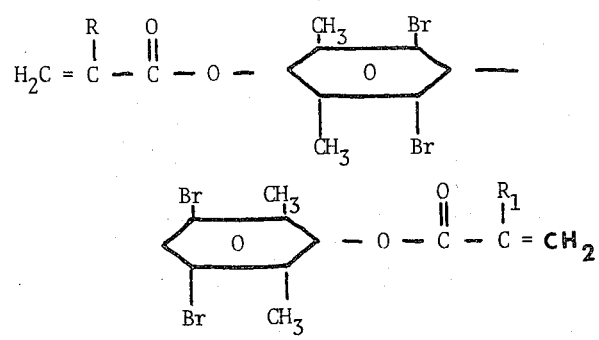

wherein R and $R_1$ is hydrogen or an alkyl group.

15. The method of claim 14, wherein the diacrylic acid ester of tetrabromotetramethyldiphenol is admixed in an amount of about 10 parts by weight per 100 parts by weight of the ethylene-containing polymer, and an oxide of antimony is admixed therewith.

16. The method of claim 15, comprising crosslink curing the polyolefin to a thermoset condition.

17. An insulated electrical conductor including a metallic conductive element having thereabout an insulation of flame resistant polyolefin compound comprising a polyolefin and an amount sufficient to effect flame retardance of a diacrylic acid ester of tetrabromotetramethyldiphenol and at least one unsaturated monocarboxlic acid selected from the group consisting of acrylic acid and an alkyl substituted acrylic acid having the formula:

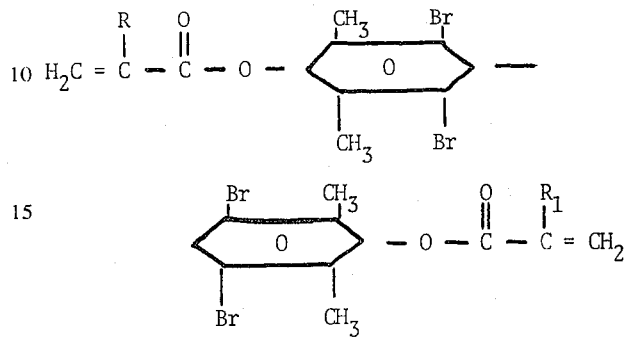

wherein R and $R_1$ is hydrogen or an alkyl group.

18. The insulated electrical conductor of claim 17, wherein the polyolefin compound comprises about 5 to about 20 parts by weight of diacrylic acid ester of tetrabromotetramethyldiphenol per 100 parts by weight of polyolefin.

19. The insulated electrical conductor of claim 17, wherein the polyolefin comprises at least one ethylene-containing polymer selected from the group consisting of polyethylene, copolymers of ethylene and other polymerizable materials, and blends of such polymers.

20. The insulated electrical conductor of claim 17, wherein the polyolefin compound includes an oxide of antimony.

21. The insulated electrical conductor of claim 17, wherein the polyolefin compound is crosslink cured to a thermoset condition.

22. An insulated electrical conductor including a metallic conductive element having thereabout an insulation of a flame resistant polyolefin compound comprising at least one ethylene-containing polymer selected from the group consisting of polyethylene, copolymers of ethylene and other polymerizable materials, and blends of such polymers, and about 5 to about 20 parts by weight of a diacrylic acid ester of tetrabromotetramethyldiphenol and at least one unsaturated monocarboxylic acid selected from the group consisting of acrylic acid and methacrylic acid per 100 parts by weight of the ethylene-containing polymer, said diacrylic acid ester having the formula:

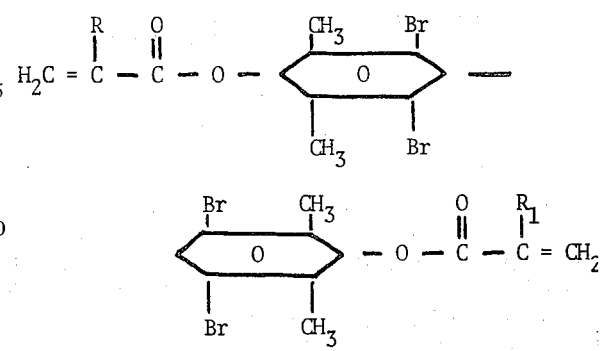

wherein R and $R_1$ is hydrogen or an alkyl group.

23. The insulated electrical conductor of claim 22, wherein the ethylene-containing polymer is crosslink cured to a thermoset condition.

24. The insulated electrical conductor of claim 23, wherein the diacrylic acid ester of the tetrabromotetramethyldiphenol is in an amount of about 10 parts by weight per 100 parts by weight of the ethylene-containing polymer, and the compound includes an oxide of antimony.

* * * * *